United States Patent [19]

Archer

[11] 4,249,474

[45] Feb. 10, 1981

[54] LOAD-CARRYING SLINGS

[75] Inventor: Jean F. Archer, Villennes sur Seine, France

[73] Assignee: STAS Societe Technique d'Accessoires Specialises, Sartrouville, France

[21] Appl. No.: 29,268

[22] Filed: Apr. 11, 1979

[30] Foreign Application Priority Data

Apr. 17, 1978 [FR] France ............................... 78 11809

[51] Int. Cl.[3] ........................... B66C 1/40; G01L 5/04

[52] U.S. Cl. ..................................... 116/212; 116/296; 116/DIG. 34; 212/157; 294/74

[58] Field of Search ....................... 116/212, DIG. 34; 73/143

[56] References Cited

U.S. PATENT DOCUMENTS

| | | | |
|---|---|---|---|
| 3,082,733 | 3/1963 | Tamny | 116/DIG. 34 X |
| 3,463,534 | 8/1969 | Norton | 73/143 X |
| 3,722,268 | 3/1973 | Crooke et al. | 73/143 |
| 3,885,428 | 5/1975 | Dalferth | 116/DIG. 34 X |
| 4,106,335 | 8/1978 | Shatto | 73/143 |

FOREIGN PATENT DOCUMENTS

| | | | |
|---|---|---|---|
| 1426965 | 3/1976 | United Kingdom | 73/143 |

*Primary Examiner*—Daniel M. Yasich
*Attorney, Agent, or Firm*—Karl F. Ross

[57] ABSTRACT

A sling has an indicator device which automatically registers the maximum permissible load which can be carried in accordance with the instantaneous angle of inclination of the strands of the sling.

4 Claims, 2 Drawing Figures

LOAD-CARRYING SLINGS

FIELD OF THE INVENTION

The present invention relates to slings.

BACKGROUND OF THE INVENTION

The maximum load which can be carried by a sling with two or more strands varies according to the angle formed between the strands. When the strands are parallel and vertical, the sling may be used at its maximum load (maximum sling load), that is to say at twice the maximum load of a strand (maximum sling load) in the case of a two-strand sling. When the angle between the strands increases, the maximum permissible load (maximum sling load) decreases; it is equal to half the maximum theoretical load when the angle formed by the strands is 120°.

In practice, however, serious accidents occur in workshops due to the fact that the operating personnel do not know the maximum permissible load of a sling when the strands are inclined or spread out, and think that it is equal to the maximum load for the sling with parallel strands.

OBJECT OF THE INVENTION

The present invention has for its object a sling in which the maximum permissible load, depending upon the inclination of the strands, is automatically indicated.

SUMMARY OF THE INVENTION

The sling according to the invention includes an indicator device for the maximum load that is permissible depending upon the relative inclination of the strands of the sling and comprising a slider member movable in relation to a scale member, one of the members being connected to an element linking the strands of the sling, such as a lifting ring, while the other member is joined simultaneously to the strands.

When the strands of the sling spread apart they pull on the member of the indicator to which they are connected, for example the slider member, and cause it to ascend relative to the other member, for example the scale member, which hangs from the lifting ring. The slider member then moves down again relative to the scale member when the strands of the sling swing together.

The connecting means are preferably flexible or articulated, so that the indicator device will not be damaged if, as frequently occurs, the operator drops the sling after having taken it off the hook of a travelling crane.

BRIEF DESCRIPTION OF THE DRAWING

An embodiment of the invention will now be described, by way of example only, with reference to the accompanying diagrammatic drawing, in which.

SPECIFIC DESCRIPTION

Figure 1:
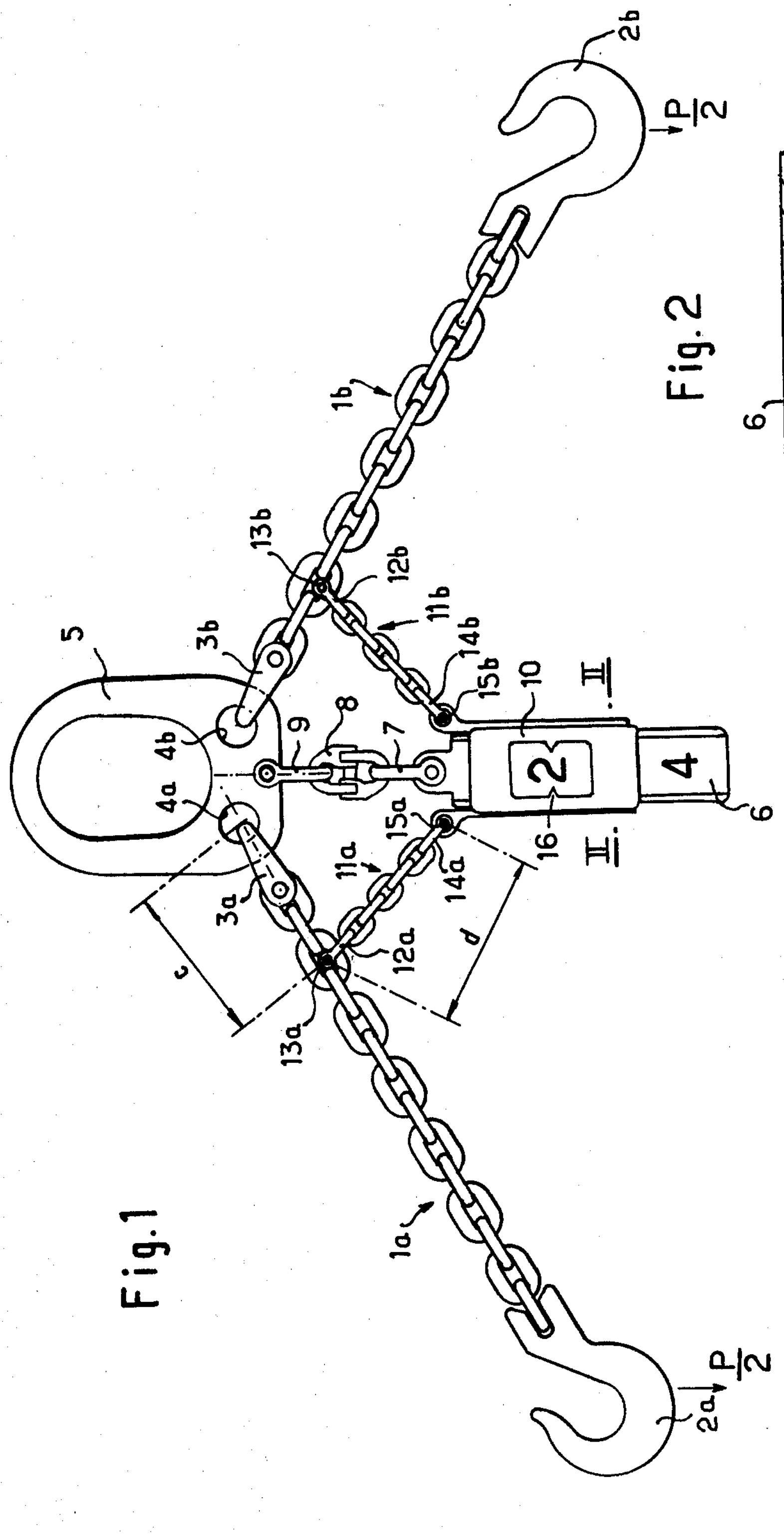
FIG. 1 is an elevation of a sling in accordance with the invention.
Figure 2:
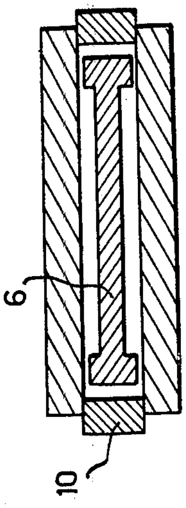
FIG. 2 is a section taken on line II—II of FIG. 1.

As shown in the drawing, the sling comprises two strands in the form of chains 1*a* and 1*b*, each of which terminates at one end of its ends, in a hook 2*a* or 2*b* and at its other end in a shackle 3*a* or 3*b* passing through a hole 4*a* or 4*b* of a lifting ring support 5.

A graduated scale rod 6 is connected by means of articulated connecting members in the form of a shackle 7 and a connecting link 8 (first connecting means) to a shackle 9 the bolt of which passes through a hole in the ring 5, this latter hole being situated along the central longitudinal plane of the ring, and thus at an equal distance from the holes 4*a* and 4*b*. The axis of the link 8 is perpendicular to the bolts of the shackles 7 and 9, which enables the scale rod 6 to move not only in the plane of the drawing, but also perpendicular to this plane.

A slider (indicator member) 10 is slidably mounted on the scale rod 6 and forms therewith an indicator. Two chains 11*a* and 11*b* (second connecting means) are connected on the one hand to the chains 1*a* and 1*b* by shackles 12*a* and 12*b* of which the bolts are designated 13*a* and 13*b*, and also to the slider 10 by means of shackles 14*a* and 14*b* the bolts 15*a* and 15*b* of which are hooked to the upper portion of the slider 10. The latter has a window at the center and carries two indicating pointers 16 and is movable in front of the markings of the scale rod 6.

The scale rod 6 is constituted by an I-section iron member with the markings being carried on its central web whereby they are recessed and protected by the side flanges so that they will not be erased if the slider scrapes against the scale rod. For its part, the slider is formed of two perforated plates which are joined together by small bars through which the bolts 15*a* and 15*b* pass at their upper ends.

It will be seen that when the angle of the chains 1*a* and 1*b* increases, the slider 10 moves upwardly along the scale rod 6 and that, conversely, when the angle decreases, the slider 10 moves downwardly along the scale rod 6.

When the two strands of a sling are spread by an angle $2\alpha$ and the sling is hooked to a load of weight P at a corresponding spacing of the hooks, each of the strands is under a tension $t=P/2\cos\alpha$. As a result, if the sling has a maximum load T, the weight P of the load carried by the sling must be at most equal to $T\cos\alpha$.

In the embodiment shown, the maximum load that the sling can bear when its strands are parallel is assumed to be 4 tons. When its strands 1*a* and 1*b* form between them an angle of 120°, that is to say when they are in the position shown in the drawing, it can carry only a load of two tons; similarly, it can carry only a three tons load when its strands form between them an angle of 83°. The figures "2", "3" and "4" are inscribed on the scale rod 6 in such a manner that they face the indicating pointers 16, respectively when the two strands 1*a* and 1*b* form an angle of 120°, when they form an angle of 83°, and when they are parallel.

It is advantageous that the distance between the axes of holes 4*a* and 4*b* should be substantially equal to that between the holes of the slider 10 through which the bolts 15*a* and 15*b* pass.

If it is desired that scale rod 6 should have reasonable dimensions, the distance d between the axes of the bolts 13*a* and 15*a* (or 13*b* and 15*b*) should be between 0.9 and 1.5 C, C being the distance between the axis of the bolt 13*a* and the axis of the hole 4*a*. This corresponds to an angle between the chains 1*a* and 11*a* which is between about 45° and 80° when the two strands 1*a* and 1*b* form between them an angle of 120°. If the condition is met, the space between the markings of the scale rod 6 is almost eliminated.

In alternative embodiments (not shown), the strands may be in the form of cables rather than chains. Moreover, the sling could have four or more strands, disposed, half to the left of the central plane of the sling perpendicular to that of FIG. 1, and half to the right of said central plane. In that case, chain 11*a* and 11*b* would each be replaced by a group of chains or cables connecting the slider to each of the corresponding strands of the sling.

What is claimed is:

1. A sling assembly comprising:

a support adapted to be suspended from a crane;

a pair of load-bearing strands each connected at one end to said support and provided with load-engaging means at their opposite ends whereby, depending upon the locations of connection of said load-engaging means to a load, said strands can be spread apart to include a variable angle with a vertical, thereby varying the maximum permissible load which can be supported by said strands; and an indicator for displaying the maximum permissible load which can be supported by the strands as a function of the angle included between the strands and a vertical, said indicator comprising:

a scale member provided with indicia representing the maximum permissible load to be displayed by said indicator and an indicator member slidably connected with said scale member for designating particular indicia of said indicator in dependence upon the relative positions of said members, first connecting means for connecting one of said members to said support, and second connecting means for connecting portions of the other of said members to said strands.

2. The assembly defined in claim 1 wherein said first connecting means includes shackles articulated to said support and said scale member respectively.

3. The assembly defined in claim 1 or claim 2 wherein said second connecting means includes a pair of flexible members connected between said indicator member and each of said strands respectively.

4. The assembly defined in claim 3 wherein, when said strands include an angle of 140°, each of the strands forms an angle between 45° and 80° with the respective member of said second connecting means.

* * * * *